May 18, 1954 W. C. GOSS Re. 23,829

METHOD OF PRESSING SHEET LUMBER

Original Filed July 1, 1946

INVENTOR.
WORTH G. GOSS
BY
Cook & Robinson
ATTORNEYS

Reissued May 18, 1954 Re. 23,829

UNITED STATES PATENT OFFICE 23,829

METHOD OF PRESSING SHEET LUMBER

Worth C. Goss, Houghton, Wash., assignor, by direct and mesne assignments, to The Sheetwood Products Company, Seattle, Wash., a corporation of Washington Original No. 2,542,025, dated February 20, 1951, Serial No. 680,839, July 1, 1946. Application for reissue February 6, 1953, Serial No. 335,622

11 Claims. (Cl. 18—47.5)

Matter enclosed in heavy brackets [ ] appears in the original patent but forms no part of this reissue specification; matter printed in italics indicates the additions made by reissue.

This invention relates to the manufacture of products which may be like or of the general character of the "sheet lumber" products described in my copending application filed December 22, 1945 under Serial No. 637,107, now United States Patent No. 2,485,587, and in an application filed under Serial No. 680,838, executed June 24, 1946, and entitled "Sheet Lumber and Its Method of Manufacture," which now has been abandoned in view of an application filed under Serial No. 98,759 as a continuation in part thereof, and in each of which applications, I have described a method of making sheets of lumber from a mixture of fiberized ligno-cellulosic materials and a hydro-plastic bonding agent; the mixed fiberized material being sifted to form a homogeneous blanket of material which is pressed, while wet, into a solid sheet between press platens and the fibers and bonding agent thereby coalesced together by the action of the heat and pressure.

In the making of a lumber sheet in accordance with the teaching of the first application above mentioned, the technique of manufacture contemplates that a platen pressure of approximately 50 pounds per square inch and a platen temperature of about 350° F. be used in forming the sheet and that the sheet be retained in the press under this heat and pressure until completely dry.

The teaching in the second application above mentioned is that the pressed sheets may be removed from the press after their moisture content has been reduced by the heat and pressure to 40% or less and the drying completed later; for example, completed in a kiln designed for this purpose.

In the manufacture of sheet lumber by the method of either of the above application, it is required that the press be vented for the ready escape from within the sheet of steam and gases that are incident to the application of heat and pressure to the wet mixture. Furthermore, since it is desirable for various reasons, that one surface of the finished sheet be perfectly smooth, this necessitates the use of a perfectly smooth surfaced press platen for forming this particular surface. The other platen, then, must necessarily be vented, and this can be accomplished by placing a fine mesh wire screen between the layer of sheet forming material and the platen, as is quite well known in the art. Also, I have found it desirable and advantageous that this platen, at the steam escape surface, be formed with slots or channels in that surface against which the screen is disposed, thus to facilitate the quick escape of dispelled gases, steam and water to the outside of the press.

The advantages in and desirability for the removal of the pressed sheets from the press while wet has been fully explained in the above second-mentioned application. Also it has been explained therein that the pressing technique described causes the lumber sheets to be formed with extremely dense, welded surface layers and an intermediate body portion that is of lesser density; this latter being due to the removal of the sheet from the press while still wet. The thickness of the welded surface portions will depend, among other things, on the platen temperature used and the length of time of pressing.

It has been found that if the usual present-day types of presses are used for the production of lumber sheets that can be removed from the press platens while still wet in their medial portions the dense surface layers that are formed will be of different thickness; that is, the welded surface layer of the sheet which is adjacent the smooth surfaced bottom platen will be of greater thickness than that welded surface layer which is adjacent the screen and upper platen; this being due to the fact that when the platens of such presses are heated to equal extent, the upwardly escaping steam and gases escaping at the screen vented side will maintain a higher percentage of moisture at this surface and thus reduce the effective temperature of the platen accordingly.

The principal disadvantages of having the sheet formed with surface layers or flanges of unequal thickness are: first, that the sheet will, upon removal and drying, warp or curve toward the side of greater thickness; and, second, the sheet will have unequal bending strength in opposite directions, which is not desirable.

In view of the above explanatory matter and the noted disadvantage resulting from the forming of welded layers of unequal thickness, at opposite surfaces, it has been the principal object of this invention to provide a novel method and means for manufacturing that particular kind of sheet lumber which has extremely dense, welded surface layers and a less dense or a relatively porous central body portion, that will insure equal thickness to these dense surface layers at opposite sides of the sheet and will thereby overcome the above mentioned disadvantages and undesirable results of having these welded layers of different thickness.

It is also an object of the invention to produce an improved sheet lumber product, and a novel press for its manufacture.

In carrying out my invention, and to attain the objects above mentioned, selected ligno-cellulosic materials such as wood chips, or other wood waste materials, are steamed under atmospheric pressure steam and then, while hot and wet, are fed through an attrition type grinder together with about 15% of a suitable plastic binder, which preferably would be that binder or bonding agent described in my application filed December 22, 1945, under Serial No. 637,107, now United States Patent No. 2,485,587 [, but which]. *The binder disclosed in the patent is made from wet ground brown rotted wood and is a lignin containing material having the characteristics of being soluble in dilute alkali solutions. The binder or bonding agent* might be any other suitable thermo-setting agent having characteristics similar to or like that described, which is characterized by having the property of giving an exceptional amount of adhesive power while wet and hot and which will solidify or set while wet, thus to give the sheet the necessary strength to resist internal disruptive forces if removed from the press before being completely dry.

The main requirement for whatever binder may be used, is that it have the necessary adhesive power to maintain the sheet intact as pressed, when it is removed from the press platens in a partially dried condition.

If addition of the plastic or bonding agent to the wet fibers is carried on in conjunction with the fiberizing of the wood in an attrition type grinder, the agent will be evenly and effectively applied to the individual fibers, and thus the adhesive property of the plastic will be made most effective. It will be mentioned, however, that the selected plastic or agent might, as an alternative, be mixed with the fiberized material after the fiberizing operation by placing the required proportionate amounts of fibers and agent in any of the well known types of rotary mixers. The exact manner of mixing the fibers and hydroplastic bonding agent is not critical except to the extent that it be effectively and completely done.

In the making of sheet lumber in accordance with the present method, the fibrous mixture as delivered into the press for consolidation into sheets, might contain from 40% to 150% moisture; and this, in the two stage pressing operation used, is reduced to around 40% or less before the sheet is removed from the press, as presently explained.

After the fibers and bonding agent have been properly mixed, the mixture is distributed, preferably by sifting it through a screen, onto a moving belt to form a blanket thereon of that designated thickness required for the formation of a sheet therefrom of a given density and final thickness by the operation of heat and pressure. Then the belt is advanced to locate the blanket of fibers between the heated upper and lower platens of a press, such for example, as that type employed in pressing veneer sheets, but modified in accordance with the teaching of the present invention with respect to platen temperatures, as presently explained.

The upper platen might be provided with grooves or channels across the face thereof for the quick and effective venting of steam and a wire screen of from 14 to 20 mesh placed between this platen surface of whatever element is used to form the lower surface of the sheet, should be perfectly smooth and not be equipped for steam venting.

As distinguished from the usual procedure of heating upper and lower platens to the same temperatures, the present method and its advantages are predicated upon the heating of the upper and lower platens to different temperatures; for example, in making the sheet lumber of the second mentioned pending application, I heat the upper, steam vented platen to a temperature of about 450° F., and heat the lower, smooth platen to about 350° F. The differential in temperatures of the platens is required in order to effect the formation of hard surface portions of equal thickness on both sides of the sheet. The difference in platen temperatures, however, would be determined in accordance with materials used and pressures employed, and established by trial or test. The gist of the invention resides in utilizing that differential in temperatures between upper and lower platens that will, for the certain materials used and temperatures and pressures employed, result in the formation of welded surface layers of the same thickness. This thickness could be controlled by the length of time the sheet is maintained under heat and pressure.

For the making of a sheet of lumber that is especially desirable for building purposes, the press platens, heated to the temperatures as above given, are closed against the fiber blanket at a pressure of from four to six hundred pounds per square inch, and this pressure is maintained for a period of not exceeding ten seconds. Then the platens are retracted. The pressing operation is then resumed in the same or in a different press under the same conditions of heat, but at about fifty pounds per square inch, and pressing at the temperature described is continued until the overall moisture content of the sheet has been reduced to about 40% or less, figured on the basis of the dry board. Then the sheet is removed from the press for its final drying. This may be completed in a heated kiln designed for the purpose.

It is to be understood that the action of heat and pressure applied as above stated, sets the bonding agent and causes the fibers to be held together with the necessary adhesiveness to resist any disruptive action of entrapped steam and gases upon release of the platen pressure. The final drying gives additional strength to the sheet and leaves the less densely welded portion comparatively porous. The welded surface portions, being of equal thickness, insure against warping and give great strength for low weight to the sheet.

It is further to be explained that since it is usually desirable that the finished sheets be of a definite and predetermined thickness, the press is equipped with limiting stops which are effective in the second stage of pressing and which definitely limit the extent to which the platens may close together regardless of the length of the pressing period. After completion of the first stage of pressing, at the high pressure of from 200 to 600 pounds, with platen temperatures at approximately 450° to 350° F., respectively, the press is opened, the stops inserted and the second stage of pressing is started. Gradually, the platens will close and the sheet compressed until their approach toward each other is limited by the stops. This should come about one minute before the end of this pressing interval. The heat of the platens, however, continues to drive out the moisture from the sheet, which is not removed until its moisture content has been reduced to the desired percentage of 40% or below.

In this process, all moisture percentages are figured on a dry weight basis.

Should it be found desirable for any special use, to provide sheets with welded surface flanges of unequal thicknesses, this can be readily accomplished by use of platen temperatures so regulated as to effect the desired results, or by cutting off the heat from one platen prior to the other to retard or discontinue the welding action at that side prior to the other.

A press suitable for carrying out the present method has been diagrammatically shown in the accompanying drawings, wherein—

Referring more in detail to the drawings—

10 designates what may be the lower platen of a press, and 11 designates the upper platen. 12 indicates any suitable mechanism whereby the platens are moved toward or from each other. The lower platen has a smooth top surface 10' and the upper platen has a number of narrow mouthed channels 13 formed at regular intervals of spacing in its bottom surface for steam escape.

Figure 1:
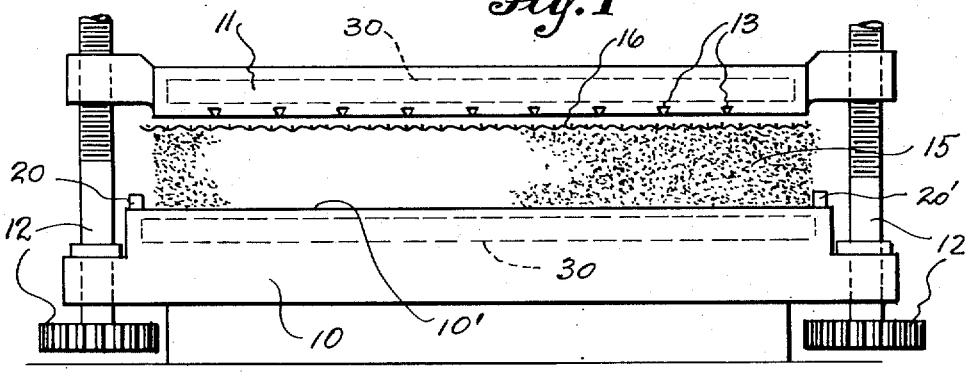
Fig. 1 is a view showing press platens as initially applied to a layer of fibers for the sheet pressing operation.
Figure 2:
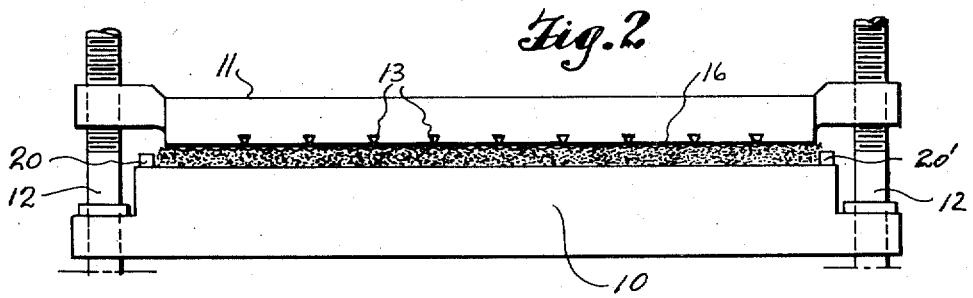
Fig. 2 shows the sheet as formed by the initial pressing operation at high pressure.
Figure 3:
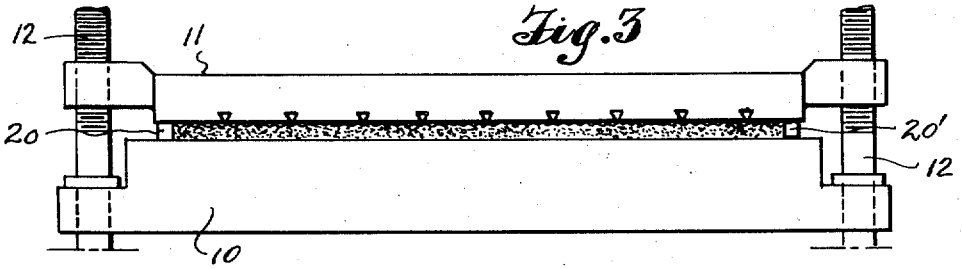
Fig. 3 is a view of the press platens as limited in their closing action during the second stage of the sheet pressing operation.

In Fig. 1, 15 designates a blanket of fibers as advanced onto the press between the platens for consolidation, and 16 designates a wire mesh screen placed between this upper platen and the fiber blanket.

20 and 20' designate stops in the form of square bosses that are applied between the platens during the second stage of pressing to determine the final thickness of the sheet.

Figure 4:
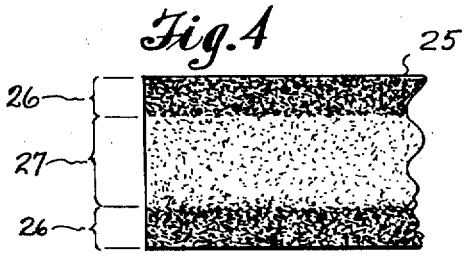
Fig. 4 is an enlarged cross sectional view of a part of a finished sheet indicating the difference in density of its surface and central portions.

In Fig. 4, I have shown a part of a finished sheet 25 in enlarged cross section. In this view, the hard dense surface layers are represented by those parts within the brackets 26 and 26 and the less dense portion is that within the bracket 27.

It will be understood that there is no pronounced line of demarcation between these layer portions or flanges and the central portion, but that they gradually merge one into the other, and that the relative thickness of the parts 26 and 27 is determined by pressures, temperatures and kind of material used.

Heating of the platens may be effected by gas, electricity or otherwise. In Fig. 1, I have indicated the platens as being equipped with electrical resistance heating elements 30 and these would be so made that each would produce the heat required in each platen.

Having thus described my invention, what I claim as new therein and desire to secure by Letters Patent is:

1. The method of manufacturing sheet lumber comprising reducing wet ligno-cellulosic material to a fiberized condition, mixing therewith a plastic bonding agent having the property of providing adhesive strength while wet, laying down a homogeneous matted pad of said mixture and pressing the pad into a unified, non-expandable sheet between press platens, one of which has a smooth surface and is heated approximately to 350° F. and the other of which has a steam vented surface engaging the pad and is heated to approximately 450° F.; the pressing operation comprising a first state of pressing applied for a relatively short time at from 200 to 600 pounds per square inch to cause the sheet to be formed with densely welded surface flanges, and a second state of pressing at a materially reduced pressure, and the sheet being removed from the press while that portion between said flanges is still wet.

2. The method as recited in claim 1 wherein the second stage of the pressing operation is carried on at 50 pounds per square inch or less, and the sheet, after being removed from the press is subjected to final drying in a kiln without consolidating pressure being applied.

3. The method of making sheet lumber comprising the steps of forming a matted, homogeneous blanket of wet ligno-cellulosic fibers and compressing the said blanket into a unified, non-expandable sheet between the platens of a press wherein one platen is formed with a smooth pressing surface and is heated to approximately 350° F. and the other platen has its pressing surface vented for the escapement from that side of the sheet of steam created in the pressing operation and is heated to approximately 450° F. to cause the resultant welding together of fibers in dense flanges to progress inwardly from the opposite surfaces at equal rate and removing the compressed blanket from the press while there is a medial portion between the flanges containing a substantial percentage of moisture.

4. The method of making sheet lumber comprising forming a blanket of ligno-cellulosic fibers having from 40% to 150% moisture content and compressing the blanket into a rigid sheet between the platens of a press wherein one platen has a smooth pressing surface in direct contact with the blanket, and the other platen is vented at its surface for escapement of steam from that side of the sheet, the smooth surfaced platen being heated to approximately 350° F. and the steam vented platen being heated to about 450° F.; said blanket being maintained under said heat and pressure until hard, dense surface layers have been formed on the sheet and the fibers have been coalesced throughout the sheet, and removed from the press while the medial portion of the sheet still contains a substantial percentage of moisture.

5. The method of making a sheet of lumber, with one smooth surface and with dense, welded surface layers and a less dense body between the said surface layers which comprises forming a mixture of moist lingo-cellulosic fiber and a bonding agent into a matter pad and compressing the pad into unity between heated press platens, one of which platens has a smooth pressing surface and is heated to approximately 350° F., and the other of which platens has its surface vented for steam escapement and is heated to approximately 450° F., and removing the sheet from between the platens after the fibers thereof have been coalesced sufficiently throughout the sheet to prevent its expansion and while the sheet still contains moisture in the medial portion thereof.

6. The method of making a sheet of lumber with one smooth surface and densely welded surface layers and a less dense body between said layers; comprising forming a moist mixture of ligno-cellulosic fibers and bonding agent into a matted pad, compressing the pad into a rigid sheet between heated press platens, one of which platens is smooth and the other is steam vented over its pressing surface; the smooth platen being heated to a degree that will effect a quick welding of the fibers adjacent thereto to form a dense surface layer, and the other platen being heated to a substantially higher degree to counteract the cooling effect of escaping steam in the fibers, and to form a dense surface layer of like thickness on that side of the sheet.

*7. The method of manufacturing sheet lumber of the character described, which comprises the steps of reducing a damp ligno-cellulosic material having a moisture content substantially above 40%, to a fiberized state, mixing the fiberized material with a hydro-plastic bonding agent of lignin containing material having the characteristic of being soluble in a dilute alkali solution and characterized by its property of setting under the action of heat while wet, preparing a layer of said mixture of materials and pressing the said layer for not more than ten seconds, between the platens of a press, at a pressure of from 200 to 600 pounds per square inch, and platen heat of a degree within a range of from 350° F. to 450° F. to cause setting of the agent and coalescing of the fibers adjacent the surface to dense layers, then reducing the pressure to approximately 50 pounds per square inch and continuing pressing until moisture content of the sheet has been reduced to 40% or below, and removing the sheet from the press while its central portion is wet.*

*8. The method of manufacturing sheet lumber comprising preparing a mixture of ligno-cellulosic fibers of relatively high moisture content and a thermo-setting bonding agent of lignin containing material having the property of setting while wet under the action of heat, forming a pad of said mixture, compressing the pad while subjecting it to a temperature that causes steam to be generated from the moisture therein to facilitate coalescing of the fibers and effect the setting of the bonding agent to unify the mixture, and removing the pad from the compressing means while the pad contains substantial moisture in the body portion then baking and completing the drying of the pressed sheet in an oven.*

*9. The method of manufacturing sheet lumber comprising reducing ligno-cellulosic material to fibrous state and coating the fibers with a plastic, thermo-setting agent of lignin containing material having the property of setting while wet, preparing a felted pad of said plastic coated fibers, compressing the said pad between press platens while subjected to heat of a degree that will effect the generation of steam from moisture in the pad with an incident coalescing of the fibers and the setting of the bonding agent, removing the compressed pad from the press while the body portion of the pad still contains a substantial quantity of moisture, then baking and completing the drying of the sheet in an oven.*

*10. The method of manufacturing sheet lumber comprising reducing ligno-cellulosic material to fibers and mixing with the fibers a wet, hydro-plastic bonding agent, comprising wet ground brown rotted wood that is characterized by its property of being thermo-setting while wet, preparing a pad of said mixture of materials, subjecting said pad to a relatively short interval of high mechanical pressure and heat within a temperature range of from approximately 350° F. to 450° F., to plasticize and coalesce the surface portions thereof, followed by a second pressing interval under substantially the same heat but at a comparatively low pressure, to set the bonding agent throughout the pad, then removing the compressed pad from the press while the body portion of the pad contains substantial moisture then baking and completing the drying of the pressed sheet in an oven.*

*11. The method of manufacturing sheet lumber of the character described comprising mixing a hydro-plastic, thermo-setting bonding agent comprising wet ground brown rotted wood with a wet, fiberized ligno-cellulosic body material, forming a pad from said mixture, subjecting said pad to a relatively short application of platen pressure and high heat to coalesce and solidify the surface portions of the pad, then subjecting the pad to a second interval of high heat, but at a materially reduced pressure to set the bonding agent throughout the pad, removing the pad from the press while the body portion of the pad contains a substantial quantity of moisture and still venting steam and finally baking the pad in an oven until dry.*

References Cited in the file of this patent or the original patent

UNITED STATES PATENTS

| Number | Name | Date |
|---|---|---|
| 1,595,414 | Mohler | Aug. 10, 1926 |
| 1,844,861 | Mason | Feb. 9, 1932 |
| 2,080,077 | Howard | May 11, 1937 |
| 2,080,078 | Mason | May 11, 1937 |
| 2,247,208 | Schorger | June 24, 1941 |
| 2,379,163 | Landon | June 26, 1945 |
| 2,381,269 | Elmendorf et al | Aug. 7, 1945 |